Figure 1:
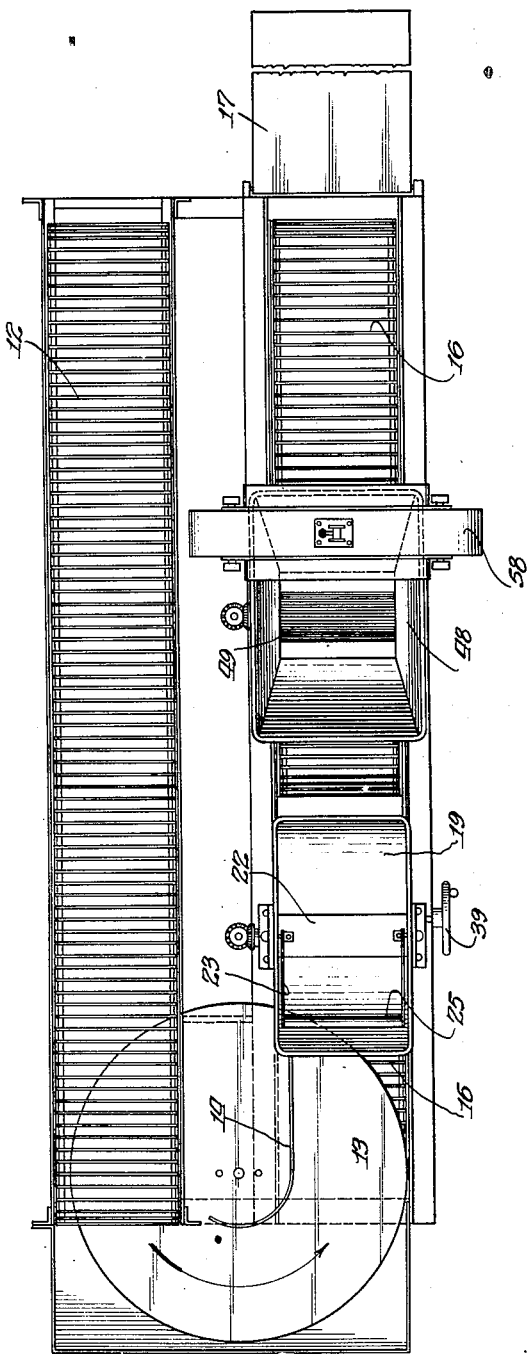

Jan. 30, 1940.    C. E. QUICK    2,188,485
COATING MACHINE
Filed Oct. 13, 1937    5 Sheets-Sheet 1

Inventor:
Claude E. Quick.
By: Brayton Richards
Attorney.

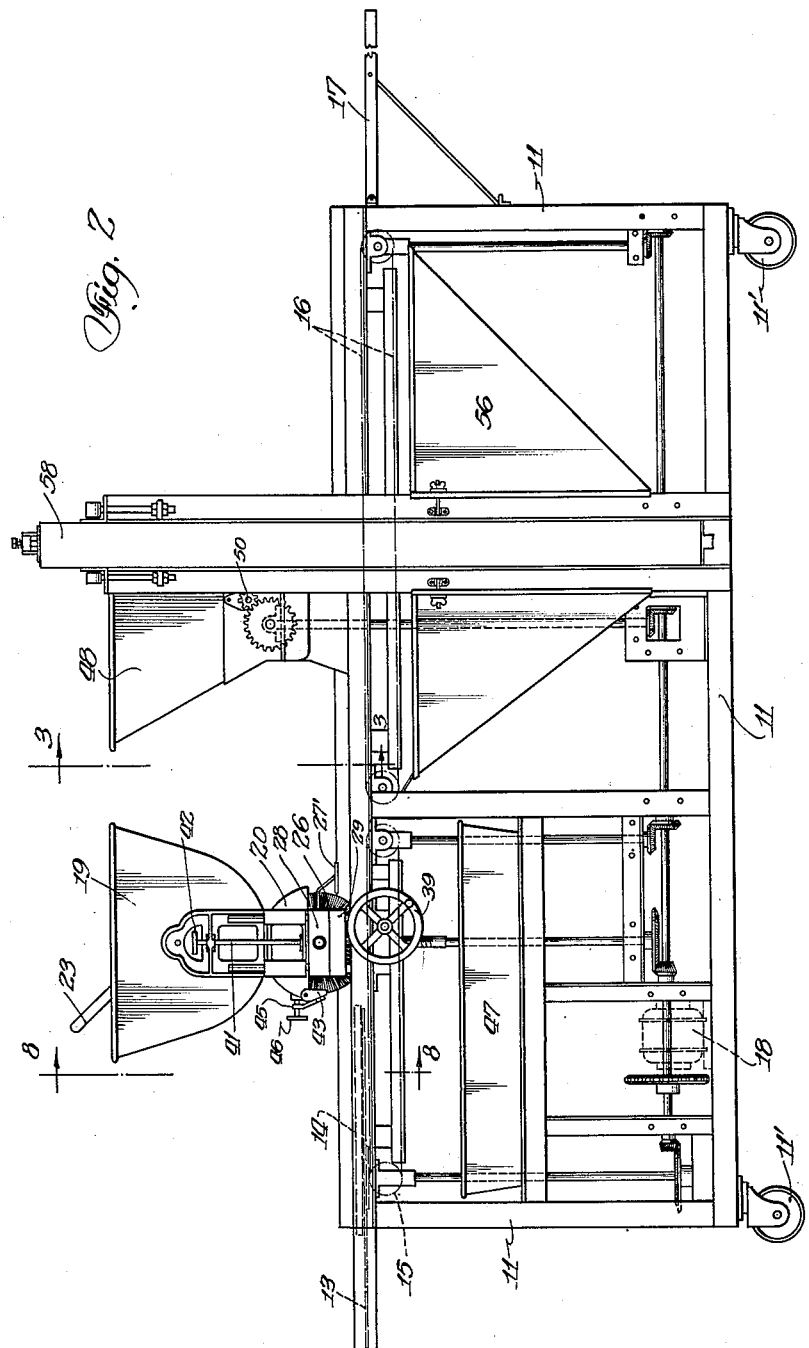

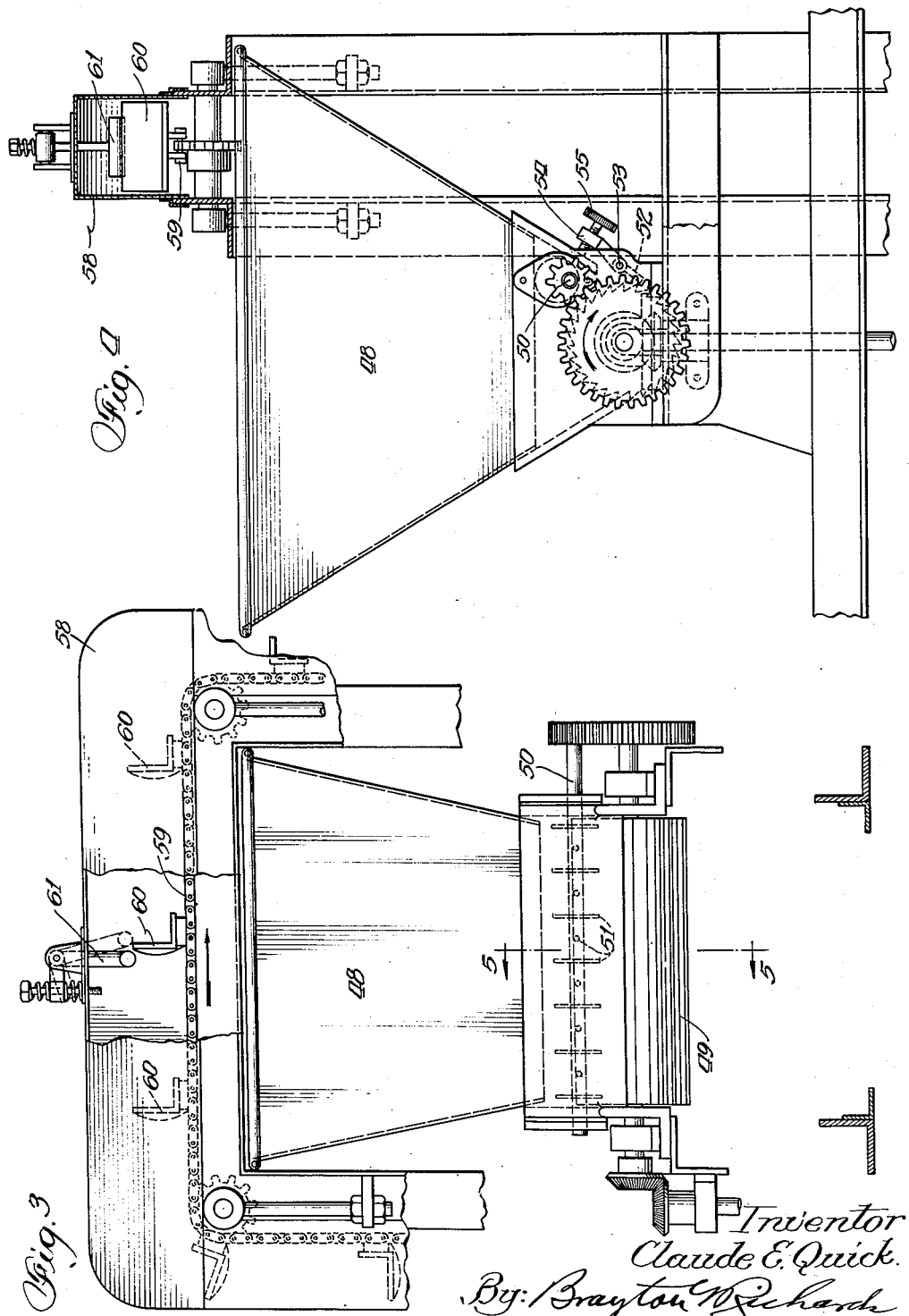

Jan. 30, 1940.   C. E. QUICK   2,188,485
COATING MACHINE
Filed Oct. 13, 1937   5 Sheets-Sheet 4
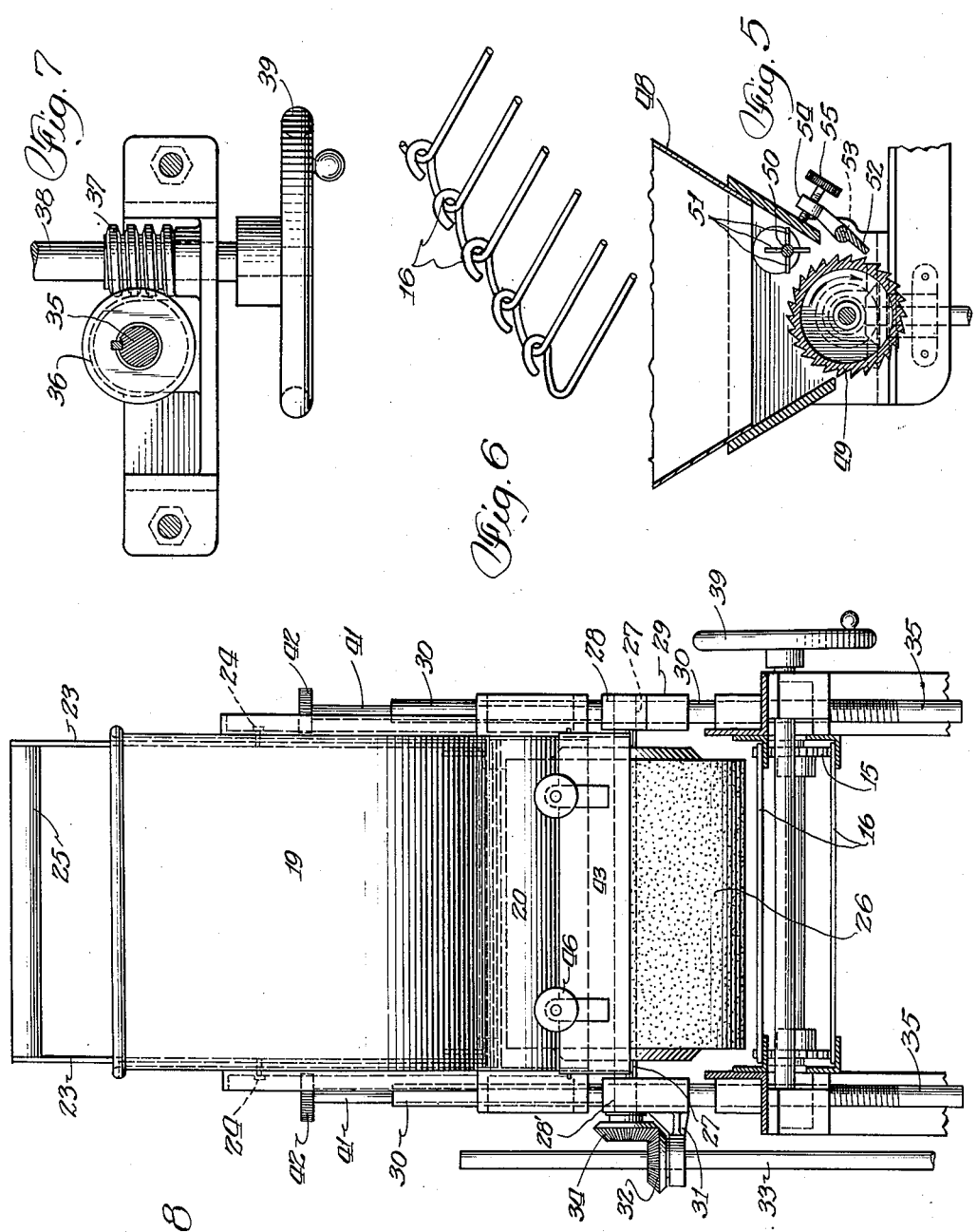

Jan. 30, 1940.  C. E. QUICK  2,188,485
COATING MACHINE
Filed Oct. 13, 1937  5 Sheets-Sheet 5
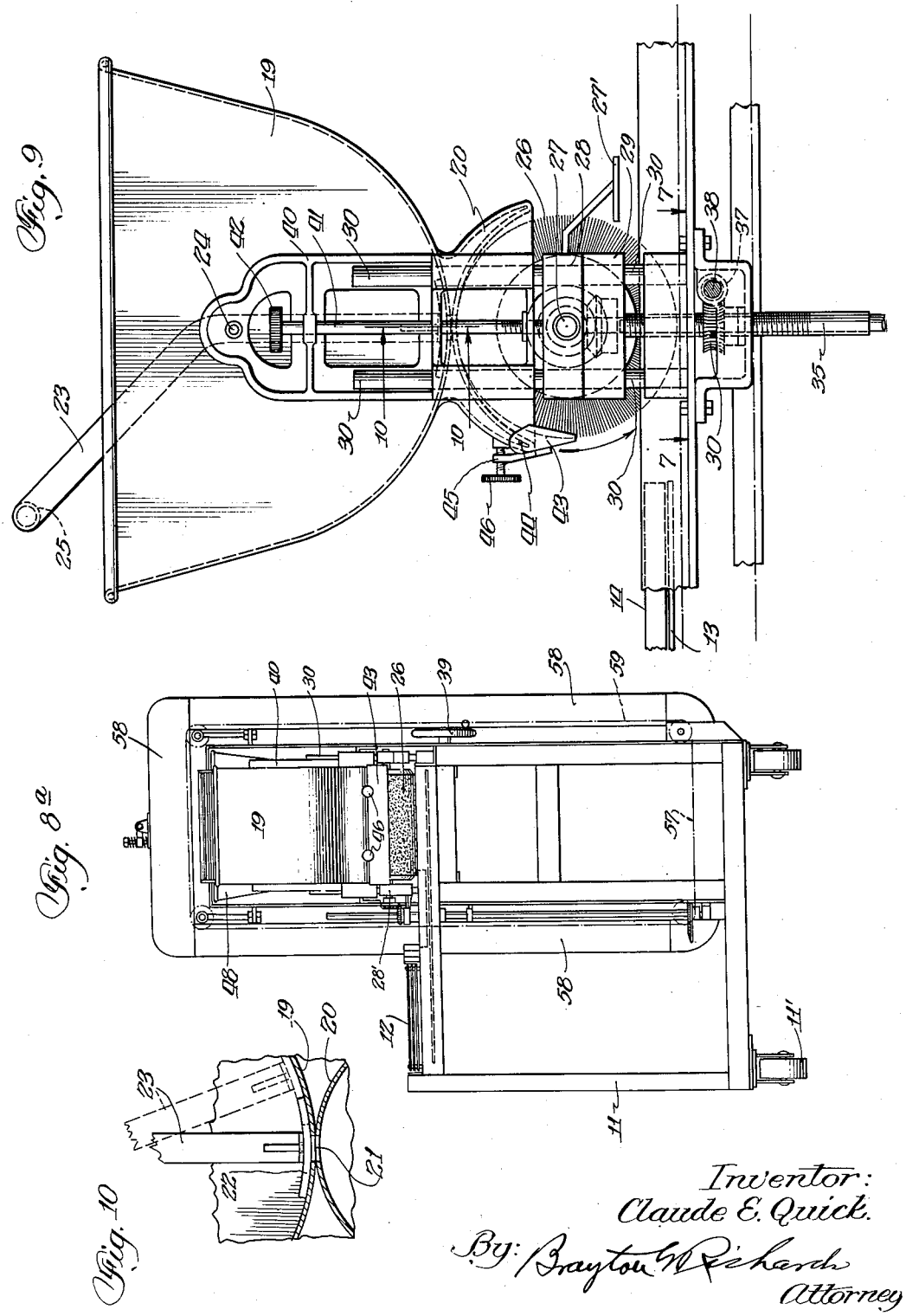
Inventor:
Claude E. Quick.
By: Brayton W. Richards
Attorney Patented Jan. 30, 1940

2,188,485

UNITED STATES PATENT OFFICE 2,188,485

COATING MACHINE

Claude E. Quick, Glendale, Calif., assignor, by mesne assignments, to Interstate Bakeries Corporation, a corporation of Delaware Application October 13, 1937, Serial No. 168,723

5 Claims. (Cl. 91—2)

The invention relates to improvements in coating machines especially adapted for coating cakes and the like, the primary object of the invention being to provide an improved machine of the character indicated which is of simple construction, capable of economical production and highly efficient in use.

Other objects will appear hereinafter.

The invention consists in the combinations and arrangements of parts hereinafter described and claimed.

The invention will be best understood by reference to the accompanying drawings forming a part of this specification and in which:

Fig. 1 is a top plan view of a machine embodying the invention;

Fig. 2 a side view of the same;

Fig. 3 a partial enlarged section taken substantially on line 3—3 of Fig. 2;

Fig. 4 a side view, partially in section, of the parts shown in Fig. 3;

Fig. 5 a partial section taken substantially on line 5—5 of Fig. 3;

Fig. 6 a perspective view of a portion of a conveyor employed in the machine;

Fig. 7 a partial section taken substantially on line 7—7 of Fig. 9;

Fig. 8 a section taken substantially on line 8—8 of Fig. 2;

Fig. 8a a rear end view of the machine;

Fig. 9 an enlarged side view of an icing hopper employed in the machine; and

Fig. 10 a partial section taken substantially on line 10—10 of Fig. 9.

The embodiment of the invention illustrated in the drawings comprises a suitable frame 11 which may be mounted on suitable caster wheels 11' if desired. An endless chain conveyor 12 is arranged as shown to extend along one side of the frame 11 to serve as a means for moving articles placed thereon from a station at the entry end of the machine to the extreme rear end thereof. A revolving transfer table 13 is arranged at the rear end of the machine to receive the articles moved by the conveyor 12, said revolving table 13 cooperating with a deflector or delivery blade 14 to deposit said articles onto a second endless chain conveyor 15 arranged opposite the delivery end of the conveyor 12 but moving in the opposite direction. The conveyor 15 is arranged to deliver said articles onto a third endless chain conveyor 16 which in turn delivers said articles onto a delivery platform 17 arranged adjacent the entry end of the conveyor 12 so that the same operator may both deliver articles to be coated to the conveyor 12 and remove them from the delivery platform 17 when their coating has been completed. The said conveyors are mounted as indicated upon the frame 11 and operatively connected as shown with a driving motor 18 mounted in the lower portion of the frame 11 and connected by suitable shafting and gears with said conveyors to operate the same constantly when desired and as will be readily understood by those skilled in this art.

An icing hopper 19 is mounted as shown over the conveyor 15. As best shown in Figs. 8, 9, and 10, the hopper 19 carries at its bottom a delivery hood 20 and a central passageway 21 is provided between said hopper and hood so that icing may freely pass from the hopper to the upper portion of the hood. A swinging valve plate 22 is mounted as shown on arms 23 pivoted at 24 on the inside of the hopper 19 and connected at their upper ends by an operating handle 25 so that said valve 22 may be readily manipulated when the hopper 19 is filled with icing or similar material to permit of the flow thereof downwardly from said hopper through the opening or passageway 21 into the top of the hood 20.

A distributing brush 26 is mounted, as shown, on a shaft 27 having bearings in bearing blocks 28 and 28'. The bearing block 28 rests loosely upon a supporting block 29 and said blocks 28, 28' and 29 are arranged as shown to slide vertically on pairs of guide rods 30 at opposite sides of the frame of the machine, as best shown in Figs. 8 and 9. As best shown in Fig. 8, the bearing block 28' carries a bracket 31 on which is swiveled a bevel gear 32 splined to the shaft 33 and meshing with a driving gear 34 on the brush shaft 27. The shaft 33 is geared, as shown, to the motor 18 and is constantly rotated thereby. By this arrangement a driving connection for the distributing brush 26 is provided which will permit of vertical adjustments of said brush relatively to the conveyor 15 and whereby said brush may be readily adjusted to cakes or articles of different heights.

As best shown in Figs. 7, 8 and 9, the blocks 28' and 29 have swiveled connections with vertical threaded adjusting shafts or screws 35 mounted as best shown in Fig. 8 on opposite sides of the frame and each carrying a worm wheel 36 meshing with a worm 37 on an operating shaft 38 having an operating hand wheel 39 at one side of the frame of the machine. By this means the adjusting shafts 35 may be simultaneously rotated to adjust the vertical positions of the blocks 28 and 28' and thereby adjust the vertical position of the distributing brush 26.

As best shown in Figs. 2, 8 and 9, supporting brackets 40 are arranged on opposite sides of the icing hopper 19, each of said brackets carrying a vertical adjusting screw 41 operated by a knurled operating head 42 at its top and resting at its bottom on the corresponding block 28 or 28' and whereby the vertical position of the icing hopper 19 relatively to the distributing brush 26 may be readily adjusted to control the amount of the flow of icing from the hopper 19, as will be readily understood.

A scraper blade 43 is arranged as best shown in Figs. 8 and 9 to extend across the brush 26, being pivoted at 44 to the ends of the hood 20. The scraper blade 43 carries adjusting brackets 45 controlled by adjusting screws 46 and whereby the position of said scraper blade relatively to the brush 26 may be adjusted as desired to control the amount of icing passing onto the articles on the conveyor 15, as will be readily understood. Stripping fingers 27' are mounted on blocks 28 and 28', as best shown in Figs. 2, 8 and 9, adjacent the forward side of the brush 26 to prevent the cakes or other objects being iced from clinging to the brush 26 and being lifted thereby from the conveyor 15. By this arrangement a suitable quantity of icing will be applied to the articles on the conveyor 15 as they pass under the distributing brush 26, as will be readily understood. A suitable drip pan 47 is arranged as shown under the conveyor 15 to catch any icing overflowing and dripping through the conveyor 15.

The iced articles are delivered by the conveyor 15 onto the conveyor 16 and are thereby carried under another hopper 48 which is designed, intended and adapted to be filled with granulated nuts or the like for further coating or ornamenting the iced cakes. As best shown in Fig. 5, the lower end of the hopper 48 is open and occupied by a constantly revolving toothed delivery wheel 49 cooperating with the constantly revolving agitator shaft 50 carrying agitator arms or fingers 51. A regulating gate 52 is pivoted at 53 to cooperate with the wheel 49, to regulate the amount of particles delivered thereby, said gate 52 being rendered adjustable by means of a bracket 54 and adjusting screw 55 as will be readily understood. By this arrangement, a limited amount of particles in the hopper 48 will be constantly delivered in small quantities and thereby sprinkled over the iced cakes passing thereunder on the conveyor 16.

As best shown in Figs. 2, 3, 4, 5 and 8a, a collecting hopper 56 is positioned under the conveyor 16 to catch the surplus sprinkled particles from the hopper 48 and deliver said surplus particles onto the lower reach 57 of a conveyor housing 58 extending under the hopper 56 and over the hopper 48 as shown. An endless chain conveyor 59, having conveyor buckets 60 thereon constantly operates in the housing 57—58 to elevate the collected surplus particles and discharge them into the top of the housing 57—58, as best indicated in Fig. 3. The discharge of the surplus particles is facilitated by a trip arrangement 61 which contacts with and jars the buckets 60 sufficiently to cause complete discharge therefrom. By this arrangement the surplus particles sprinkled over the cakes and not adhering thereto will be connected and returned to the hopper 48 for reuse.

By these means a machine is provided which is of simple construction, capable of economical production and highly efficient in use. The specific form and arrangement of parts is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. In a machine of the class described, including means for conveying food articles, a rotary brush adapted to contact said articles on said conveying means to coat the same with icing, and means for supplying icing to said brush; and a stripper for preventing the adherence of said coated articles to said brush, said stripper being positioned out of contact with said brush and adapted to contact only such of said articles as adhere to said brush.

2. The structure of claim 1, and means for adjusting said stripper relative to said conveyor.

3. The structure of claim 1, said brush including a shaft, bearings receiving the ends of said shaft, means for adjusting said bearings and brush towards and away from said conveying means, and said stripper being carried by said bearings.

4. In a machine of the class described, including means for conveying food articles, a rotary applicator adapted to contact said articles on said conveying means to coat the same with icing, and means for supplying icing to said applicator; and a stripper for preventing the adherence of said coated articles to said applicator, said stripper being positioned out of contact with said applicator and adapted to contact only such of said articles as adhere to said applicator.

5. In a machine of the class described, including means for conveying food articles, a rotary applicator adapted to contact said articles on said conveying means to coat the same with icing, and means for supplying icing to said applicator; and a stripper for preventing the adherence of said coated articles to said applicator, said stripper being positioned out of contact with said applicator and adapted to contact only such of said articles as adhere to said applicator, and means for adjusting said stripper relative to said conveyor.

C. E. QUICK.